United States Patent
Atarashi et al.

(10) Patent No.: US 7,804,261 B2
(45) Date of Patent: Sep. 28, 2010

(54) MOTOR CONTROL METHOD AND MOTOR CONTROL APPARATUS

(75) Inventors: Hirofumi Atarashi, Shioya-gun (JP); Hiroyuki Isegawa, Sakura (JP)

(73) Assignee: Honda Motor Co., Ltd, Tokyo (JP)

( * ) Notice: Subject to any disclaimer, the term of this patent is extended or adjusted under 35 U.S.C. 154(b) by 315 days.

(21) Appl. No.: 11/998,429

(22) Filed: Nov. 30, 2007

(65) Prior Publication Data
US 2008/0129237 A1   Jun. 5, 2008

(30) Foreign Application Priority Data
Dec. 1, 2006   (JP) ............... P2006-325399

(51) Int. Cl.
*H02P 3/00* (2006.01)
(52) U.S. Cl. ............... 318/139; 318/461
(58) Field of Classification Search ............... 318/139, 318/461, 432, 798
See application file for complete search history.

(56) References Cited

U.S. PATENT DOCUMENTS 5,677,582 A * 10/1997 Lutz et al. ............ 310/75 R
7,089,897 B2 * 8/2006 Schafer et al. ............ 123/90.17
2005/0090366 A1 * 4/2005 Namba ............ 477/7

FOREIGN PATENT DOCUMENTS

| EP | 0 511 796 A1 | 4/1992 |
| GB | 26880 A | 5/1911 |
| GB | 115 509 A | 5/1918 |
| JP | 07-052854 A | 2/1995 |
| JP | 8-308276 A | 11/1996 |
| JP | 11-318098 A | 11/1999 |
| JP | 2000-201461 A | 7/2000 |
| JP | 2000-324884 A | 11/2000 |
| JP | 2001-346364 A | 12/2001 |
| JP | 2002-339856 A | 11/2002 |
| JP | 2004-242398 A | 8/2004 |
| JP | 2005-192325 A | 7/2005 |
| JP | 2006-254521 A | 9/2006 |
| JP | 2006-288051 A | 10/2006 |

* cited by examiner

*Primary Examiner*—Rina I Duda
(74) *Attorney, Agent, or Firm*—Arent Fox LLP (57) ABSTRACT

A motor control method that includes the steps of: rotationally driving a motor that is provided with a rotor having permanent magnet pieces, and a stator; and short circuiting a plurality of phases of the motor when the rotational frequency of the motor is equal to or greater than a predetermined rotational frequency.

5 Claims, 10 Drawing Sheets

MOTOR CONTROL METHOD AND MOTOR CONTROL APPARATUS

Priority is claimed on Japanese Patent Application No. 2006-325399, filed Dec. 1, 2006, the contents of which are incorporated herein by reference.

BACKGROUND OF THE INVENTION

1. Field of the Invention

The present invention relates to a motor control method and a motor control apparatus.

2. Description of Related Art

During disassembly of for example a motor that is equipped with permanent magnets, there is known a conventional method of demagnetizing the permanent magnets by impressing a high-frequency voltage between the terminals of the windings of the motor. (For example, refer to Japanese Unexamined Patent Application, First Publication No. 2001-346364).

However, in this method, a special apparatus for impressing the high-frequency voltage on the motor is required, and there is the risk that damage may occur due to the temperature of the windings of the motor excessively rising.

To address such problems, for a hybrid vehicle that is conventionally equipped with a motor having permanent magnets and an internal combustion engine as driving sources, there is known a conventional method of performing zero torque control in which during disassembly of the motor, in the state of rotationally driving the motor with the drive power of the internal combustion engine while performing control so that the output torque of the motor becomes approximately zero, the terminal voltage of the motor is maintained at or below the power supply voltage of the battery (for example, refer to Japanese Unexamined Patent Application, First Publication No. 2004-242398).

In the method according to the latter of the aforesaid conventional art, since zero torque control is performed so that the output torque of the motor becomes approximately zero, the charge-and-discharge current of the battery is controlled so as to become zero, and the rotational energy of the internal combustion engine is converted to thermal energy. However, according to this method, since the terminal voltage of the motor is maintained at or below the supply voltage of the battery, current is actually made to be discharged from the battery so as to compensate the losses by the motor and the inverter for motor drive control. For this reason, in the case for example of the battery being degraded, it is not possible to maintain the discharging from the battery, and so there is a possibility of difficulties arising in performing the desired demagnetization.

The present invention was made in view of the above circumstances, and has an object of providing a motor control method and a motor control apparatus that can suitably demagnetize permanent magnets provided in a motor.

SUMMARY OF THE INVENTION

In order to achieve the above-mentioned object, the present invention adopts the followings.

That is, the present invention employs a motor control method including the steps of: rotationally driving with a driving source a motor that is provided with a rotor having permanent magnet pieces, and a stator; and short circuiting a plurality of phases of the motor when the rotational frequency of the motor is equal to or greater than a predetermined rotational frequency.

According to the motor control method described above, it is possible to prevent excessively large torque fluctuations from occurring by short circuiting a plurality of phases of the motor in the state of the rotational frequency of the motor that is rotationally driven by the driving source being equal to or greater than a predetermined rotational frequency, the short-circuit torque that occurs when having short-circuited the plurality of phases of the motor being less than a predetermined value, and the fluctuations in the phase currents corresponding to the rotational frequency when having short circuited the plurality of phases of the motor (that is, short circuit currents) being less than the predetermined fluctuations. Moreover, it is possible to stably impress the armature magnetic flux of the desired weak magnetic field phase onto the permanent magnet pieces of the rotor, possible to cause the permanent magnet pieces to undergo self heating due to overcurrent loss caused by this armature magnetic flux, and possible to suitably and efficiently demagnetize the permanent magnet pieces.

When at least a motor state quantity including the phase currents of the motor fluctuates by at least a predetermined value during execution of the short circuiting, the short circuiting and the rotational driving may be stopped.

In this case, for example when the detected value of a short circuit current falls to the predetermined value or less, or when the induced voltage constant that can be calculated from the detected value of the short circuit current falls to the predetermined value or less, it is determined that the desired demagnetization is complete. Then, by stopping the short circuiting of the plurality of phases of the motor and the rotational driving of the motor by the driving source, it is possible to prevent excessive energy consumption. Also, it is possible to prevent heat damage from occurring in the motor by stopping the short circuiting of the plurality of phases of the motor and the rotational driving of the motor by the driving source in the case of, for example, the temperature of the permanent magnet pieces and the temperature of the stator increasing to the predetermined value or higher.

The present invention also employs a motor control apparatus provided with: a motor provided with a rotor having permanent magnet pieces, and a stator; a driving source that rotationally drives the rotor; a short circuiting device that short circuits a plurality of phases of the motor; and a control device that rotationally drives the rotor with the driving source, and short circuits the plurality of phases of the motor by the short circuiting device in the case of the rotational frequency of the motor being equal to or greater than a predetermined rotational frequency.

According to the motor control apparatus of the above-described constitution, it is possible to prevent excessively large torque fluctuations from occurring by short circuiting a plurality of phases of the motor in the state of the rotational frequency of the motor that is rotationally driven by the driving source being equal to or greater than a predetermined rotational frequency, the short-circuit torque that occurs when having short-circuited the plurality of phases of the motor being less than a predetermined value, and the fluctuations in the phase currents corresponding to the rotational frequency when having short circuited the plurality of phases of the motor (that is, short circuit currents) being less than predetermined fluctuations. Moreover, it is possible to stably impress the armature magnetic flux of the desired weak magnetic field phase onto the permanent magnet pieces of the rotor, possible to cause the permanent magnet pieces to undergo self heating due to overcurrent loss caused by this armature magnetic flux, and possible to suitably and efficiently demagnetize the permanent magnet pieces.

It may be arranged such that: the driving source is an internal combustion engine; the motor and the internal combustion engine are mounted in a vehicle as the driving source that drives the vehicle for traveling; and a connecting/disconnecting device is provided capable of connecting/disconnecting a coupling between driving wheels of the vehicle, and the motor and the internal combustion engine, wherein the control device releases a coupling between the driving wheels of the vehicle, and the motor and the internal combustion engine with the connecting/disconnecting device when rotationally driving the rotor with the internal combustion engine.

In this case, it is possible to suitably and rotationally drive the motor with the internal combustion engine without the need to provide a special apparatus as the driving source and possible to suitably and efficiently demagnetize the permanent magnet pieces.

It may be arranged such that: the motor control apparatus is further provided with a detection device that detects at least a motor state quantity including the phase currents of the motor; and the control device stops the short circuiting operation by the short circuiting device and the rotational driving operation by the driving source in the case of a detection value obtained by the detection device or a state quantity according to this detection value fluctuating by at least a predetermined value in the state of short circuiting a plurality of phases of the motor.

In this case, for example when the detected value of a short circuit current falls to the predetermined value or less, or when the induced voltage constant that can be calculated from the detected value of the short circuit current falls to the predetermined value or less, it is determined that the desired demagnetization is complete. Then, by stopping the short circuiting of the plurality of phases of the motor and the rotational driving of the motor by the driving source, it is possible to prevent excessive energy consumption. Also, it is possible to prevent heat damage from occurring in the motor by stopping the short circuiting of the plurality of phases of the motor and the rotational driving of the motor by the driving source in the case of, for example, the temperature of the permanent magnet pieces and the temperature of the stator increasing to a predetermined value or higher.

It may be arranged such that: the rotor is provided with a plurality of rotor members each equipped with the permanent magnet pieces and capable of changing the mutual relative phases, and a phase changing device that changes the induced voltage constant by changing the relative phases of the rotor members; and the control device increases the induced voltage constant by at least a predetermined value by the phase changing device when short circuiting the plurality of phases of the motor.

In this case, it is possible to increase the armature magnetic flux of the weak magnetic field phase that is impressed on the permanent magnet pieces of each rotor member by increasing the induced voltage constant by the phase changing device, and possible to efficiently demagnetize the permanent magnet pieces.

DETAILED DESCRIPTION OF THE INVENTION

An embodiment of a motor control method and a motor control apparatus of the present invention will be described below with reference to the appended drawings.

Figure 1:
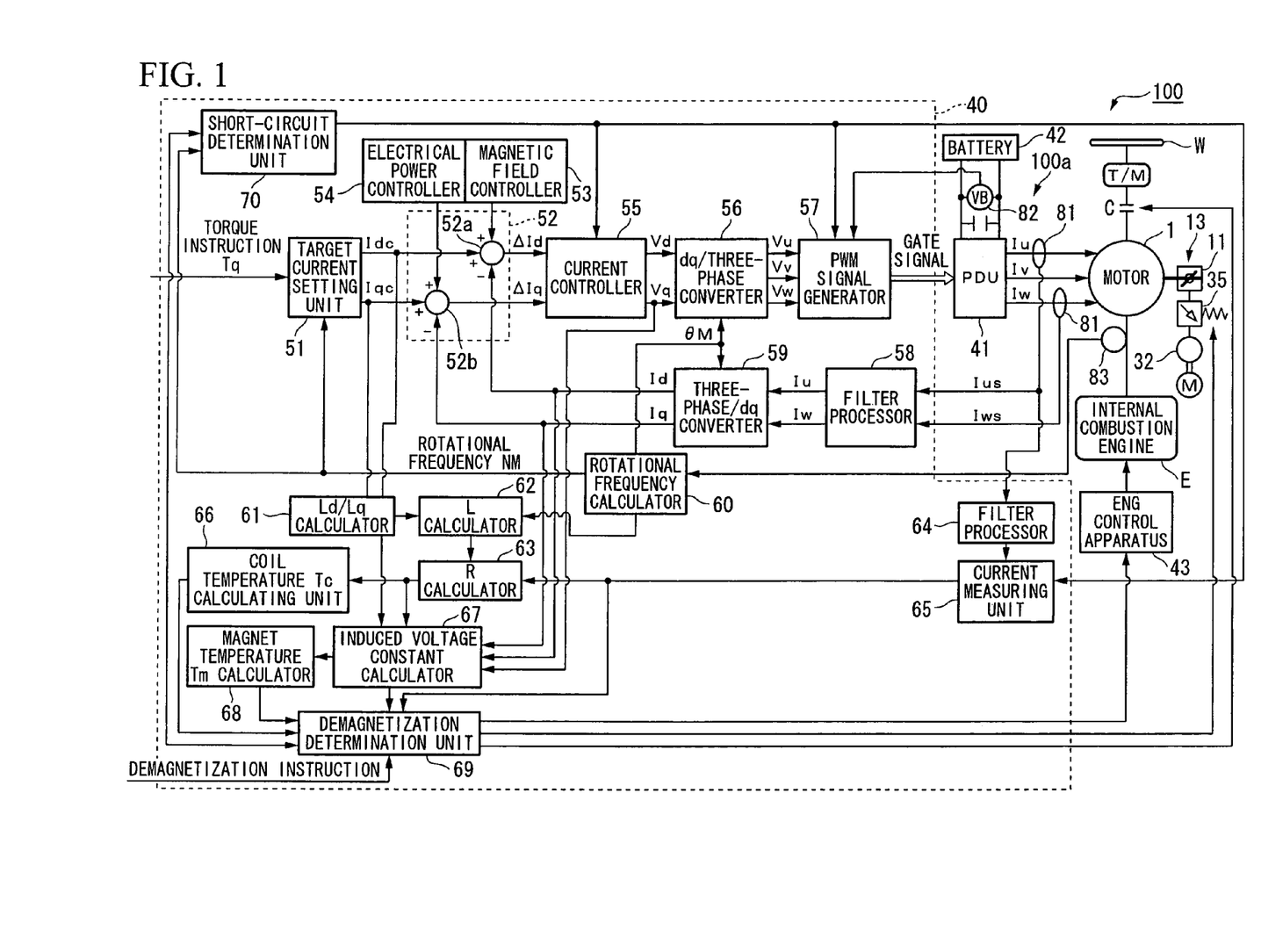
FIG. 1 is an outline block diagram of a vehicle according to one embodiment of the present invention.

The motor control apparatus of the present embodiment is mounted as a controller in a vehicle such as a hybrid vehicle or an electric vehicle that is provided with a motor as the traveling driving source. Specifically, as shown in FIG. 1, a vehicle 100 that is mounted with a control apparatus 100a, is a parallel hybrid vehicle that is provided with a motor 1 and an internal combustion engine E as driving sources. The motor 1, the internal combustion engine E and a transmission T/M are connected in series, and at least the drive force of the motor 1 or the internal combustion engine E is transmitted to driving wheels W of the vehicle 100 via a clutch C and the transmission T/M.

When drive force is transmitted from the driving wheels W side to the motor 1 during deceleration of the vehicle 100, the motor 1, by functioning as a generator, generates so-called regenerative brake force and recovers the kinetic energy of the vehicle body as electrical energy (regenerated energy). Also, even when the power of the internal combustion engine E is transmitted to the motor 1, the motor 1 functions as a generator and generates electrical energy.

Here, various sensors such as an accelerator pedal opening sensor, a brake pedal switch sensor, and a wheel speed sensor and the like are provided in the vehicle 100 in which is provided the control apparatus 100a. Based on the detection results of these sensors, the control apparatus 100a outputs a control instruction to the respective control systems of the internal combustion engine E, the motor 1, the clutch C, and the transmission T/M.

As shown for example in FIG. 2 to FIG. 5, the motor 1 is an inner rotor-type brushless motor in which a rotor unit 3 is arranged on the inner circumference side of an annular stator 2.

Figure 2:
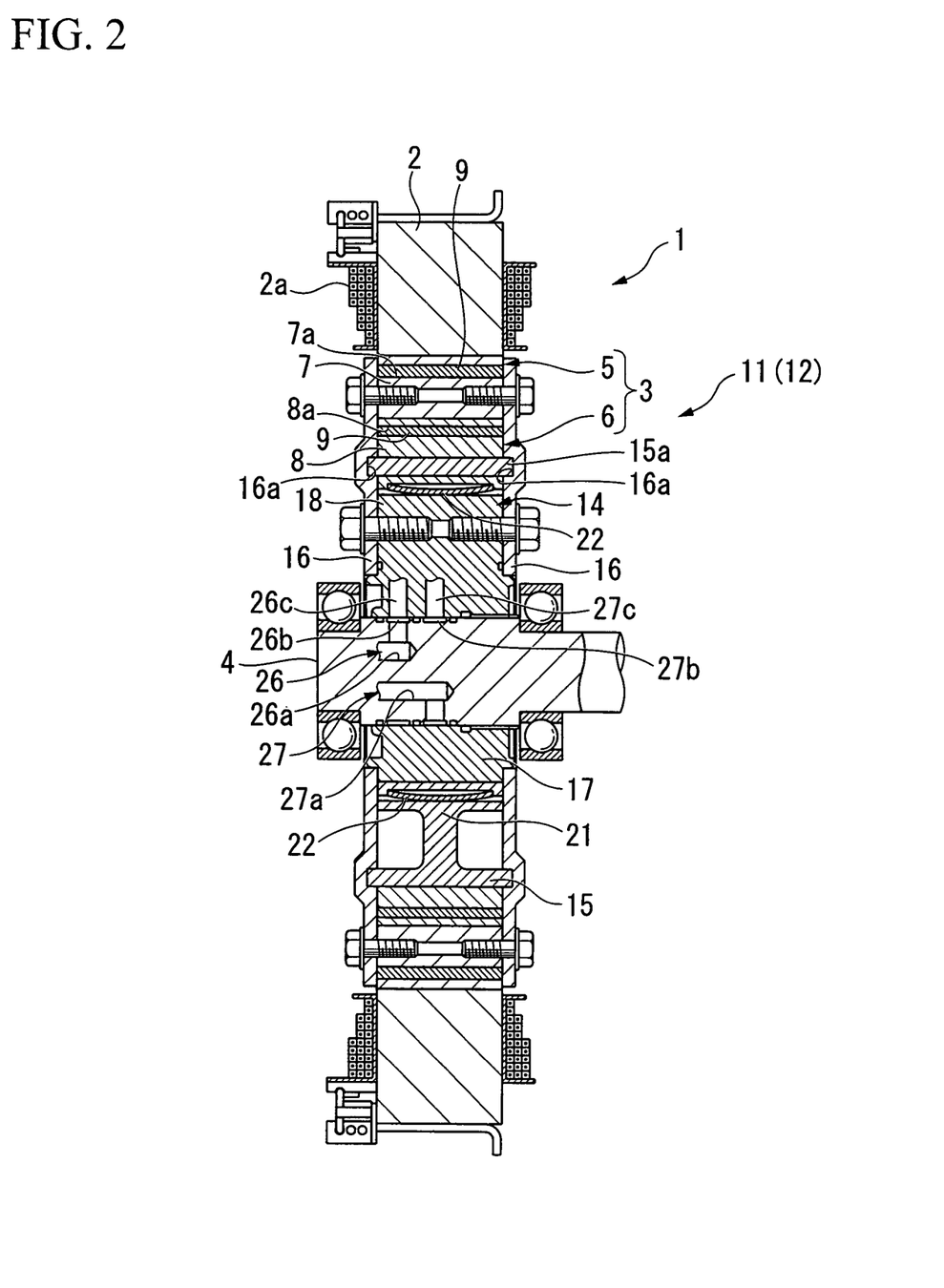
FIG. 2 is a main portion sectional view of a motor according to the same embodiment.

The stator 2 has stator windings 2a of a plurality of phases, and the rotor unit 3 has a rotation axis 4 in the axis portion.

The rotating force of the motor 1 is transmitted to the driving wheels W via the clutch C and the transmission T/M.

The rotor unit 3 is for example provided with an annular outer circumference side rotor 5 and an annular inner circumference side rotor 6 that is coaxially disposed on the inner side of the outer circumference side rotor 5, with the outer circumference side rotor 5 and the inner circumference side rotor 6 being relatively rotatable in the range of a predetermined set angle.

In the outer circumference side rotor 5 and the inner circumference side rotor 6, annular rotor cores 7 and 8, which are the respective rotor bodies, are formed out of sintered metal, and at a position shifted to the outer circumference side of the rotor cores 7 and 8, a plurality of magnet mounting slots 7a and 8a are formed at intervals in the circumferential direction. Two flat plate permanent magnets 9 and 9 that are magnetized in the thickness direction are mounted side-by-side in the magnet mounting slots 7a and 8a. The two permanent magnets 9 and 9 that are mounted in the magnet mounting slots 7a and 8a are magnetized in the same direction, and the pairs of permanent magnets 9 that are mounted in the magnet mounting slots 7a, 7a and 8a, 8a are set so that their magnetic pole orientations are reversed. That is, in the rotors 5 and 6, a pair of the permanent magnets 9 in which the outer circumference side is the N pole, and a pair of the permanent magnets 9 in which the outer circumference side is the S pole are alternately arranged in the circumferential direction. Note that a cutaway portion 10 is formed along the axial direction of the rotors 5 and 6 for controlling (for example, suppressing magnetic path short circuiting) the flow of magnetic flux of the permanent magnets 9 between each of the magnet mounting slots 7a, 7a and 8a, 8a that are adjacent on the outer circumference side of the rotors 5 and 6.

The same number of magnet mounting slots 7a and 8a are provided in the outer circumference side rotor 5 and the inner circumference side rotor 6, and so the permanent magnets 9, . . . , 9 of both rotors 5 and 6 have a 1 to 1 correspondence. Accordingly, by making the pairs of permanent magnets 9 in the magnet mounting slots 7a and 8a of the outer circumference side rotor 5 and the inner circumference side rotor 6 face the same pole (different polarity placement), it is possible to obtain a weak magnetic field state in which the magnetic field of the entire rotor unit 3 is most weakened (for example, refer to FIG. 5 and FIG. 6B). Also, by making the pairs of permanent magnets 9 in the magnet mounting slots 7a and 8a of the outer circumference side rotor 5 and the inner circumference side rotor 6 face mutually different poles (same polarity placement), it is possible to obtain a strong magnetic field state in which the magnetic field of the entire rotor unit 3 is most strengthened (for example, refer to FIG. 3 and FIG. 6A).

Also, the rotor unit 3 is provided with a rotating mechanism 11 for relatively rotating the outer circumference side rotor 5 and the inner circumference side rotor 6. This rotating mechanism 11 constitutes a portion of a phase changing device 12 for arbitrarily changing the relative phase of the outer circumference side rotor 5 and the inner circumference side rotor 6, and is operated by pressure of hydraulic fluid that is a non-compressive hydraulic fluid (for example, lubricating oil for the transmission T/M and engine oil, etc.).

Figure 7:
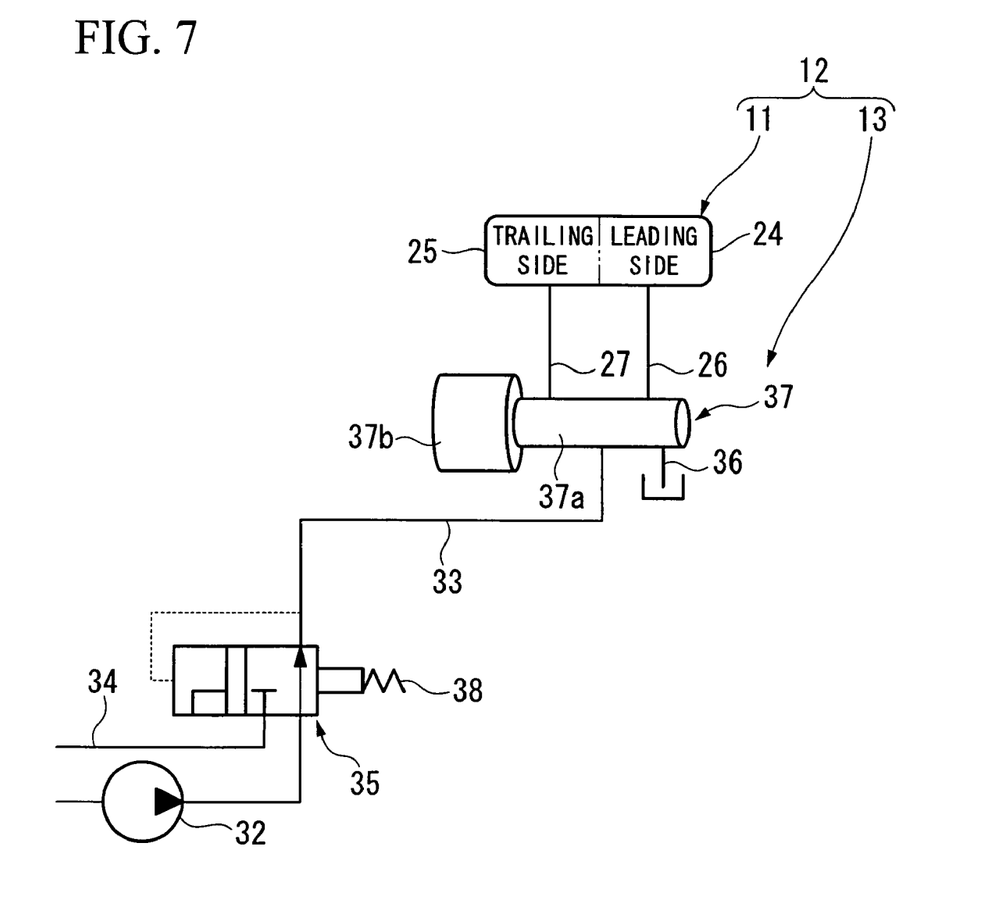
FIG. 7 is a lineblock drawing of a hydraulic pressure control device according to the same embodiment.

The phase changing device 12 is as shown for example in FIG. 7 constituted to be provided with the rotating mechanism 11 and a hydraulic pressure control device 13 that controls the pressure of the hydraulic fluid that is supplied to the rotating mechanism 11 as main elements.

The rotating mechanism 11 is as shown for example in FIG. 2 to FIG. 5 provided with a vane rotor 14 that is spline engaged to be integrally rotatable on the outer circumference of the rotation axis 4, and an annular housing 15 that is disposed to be relatively rotatable on the outer circumference side of the vane rotor 14. The annular housing 15 is integrally engaged and fixed to the inner circumference surface of the inner circumference side rotor 6, and the vane rotor 14 is integrally joined to the outer circumference side rotor 5 via a pair of disk-shaped drive plates 16, 16 that straddle the side end portions of both sides of the annular housing 15 and the inner circumference side rotor 6. Accordingly, the vane rotor 14 is integrated with the rotation axis 4 and the outer circumference side rotor 5, and the annular housing 15 is integrated with the inner circumference side rotor 6.

In the vane rotor 14, a plurality of vanes 18 projecting to the outside in the radial direction are provided in the circumferential direction at regular intervals on the outer circumference of a cylindrical boss portion 17 that is spline engaged to the rotation axis 4. On the other hand, a plurality of concave portions 19 are provided in the circumferential direction at regular intervals on the inner circumferential surface of the annular housing 15, and the corresponding vanes 18 of the vane rotor 14 are arranged to be accommodated in the concave portions 19. Each concave portion 19 is constituted by a bottom wall 20 that has an arc surface that approximately matches the rotation track of the distal end portion of the vane 18, and an approximately triangular shape partition wall 21 that separates neighboring concave portions 19, 19. During relative rotation of the vane rotor 14 and the annular housing 15, the vane 18 can be displaced between one partition wall 21 and another partition wall 21.

In the present embodiment, the partition walls 21, by making contact with the vanes 18, function as regulating members that regulate the relative rotation of the vane rotor 14 and the annular housing 15. Note that a seal member 22 is provided along the axial direction at the distal end portion of each vane 18 and the distal end portion of the partition wall 21, and that with these seal members 22, each space between the vane 18 and the bottom wall 20 of the concave portion 19 and between the partition wall 21 and the outer circumference surface of the boss portion 17 is sealed liquid tight.

Also, a base portion 15a of the annular housing 15 that is fixed to the inner circumference side rotor 6 is formed in a cylindrical shape of a fixed thickness, and as shown for example in FIG. 2, projects outward in the axial direction with respect to the inner circumference side rotor 6 and the partition walls 21. Each end portion that projects to the outer side of this base portion 15a is held in a freely slidable manner in an annular guide groove 16a that is formed in the drive plates 16, and so the annular housing 15 and the inner circumference side rotor 6 are supported in a floating state by the outer circumference side rotor 5 and the rotation axis 4.

The drive plates 16, 16 of both sides that couple the outer circumference side rotor 5 and the vane rotor 14 make close contact in a freely slidable manner with both side surfaces of the annular housing 15 and block off the sides of each concave portion 19 of the annular housing 15. Accordingly, in each concave portion 19, an independent space portion is formed by the boss portion 17 of the vane rotor 14 and the drive plates 16, 16 of both sides, and this space portion becomes an introduction space 23 where operating fluid is introduced. Each introduction space 23 is divided into two rooms by each corresponding vane 18 of the vane rotor 14, with one room being a leading side operating chamber 24 and the other room being a trailing side operating chamber 25.

The leading side operating chamber 24 relatively rotates the inner circumference side rotor 6 in the leading direction with respect to the outer circumference side rotor 5 by the pressure of the operating fluid that is introduced therein, and the trailing side operating chamber 25 relatively rotates the inner circumference side rotor 6 in the trailing direction with respect to the outer circumference side rotor 5 by the pressure of the operating fluid that is introduced therein.

Figure 3:
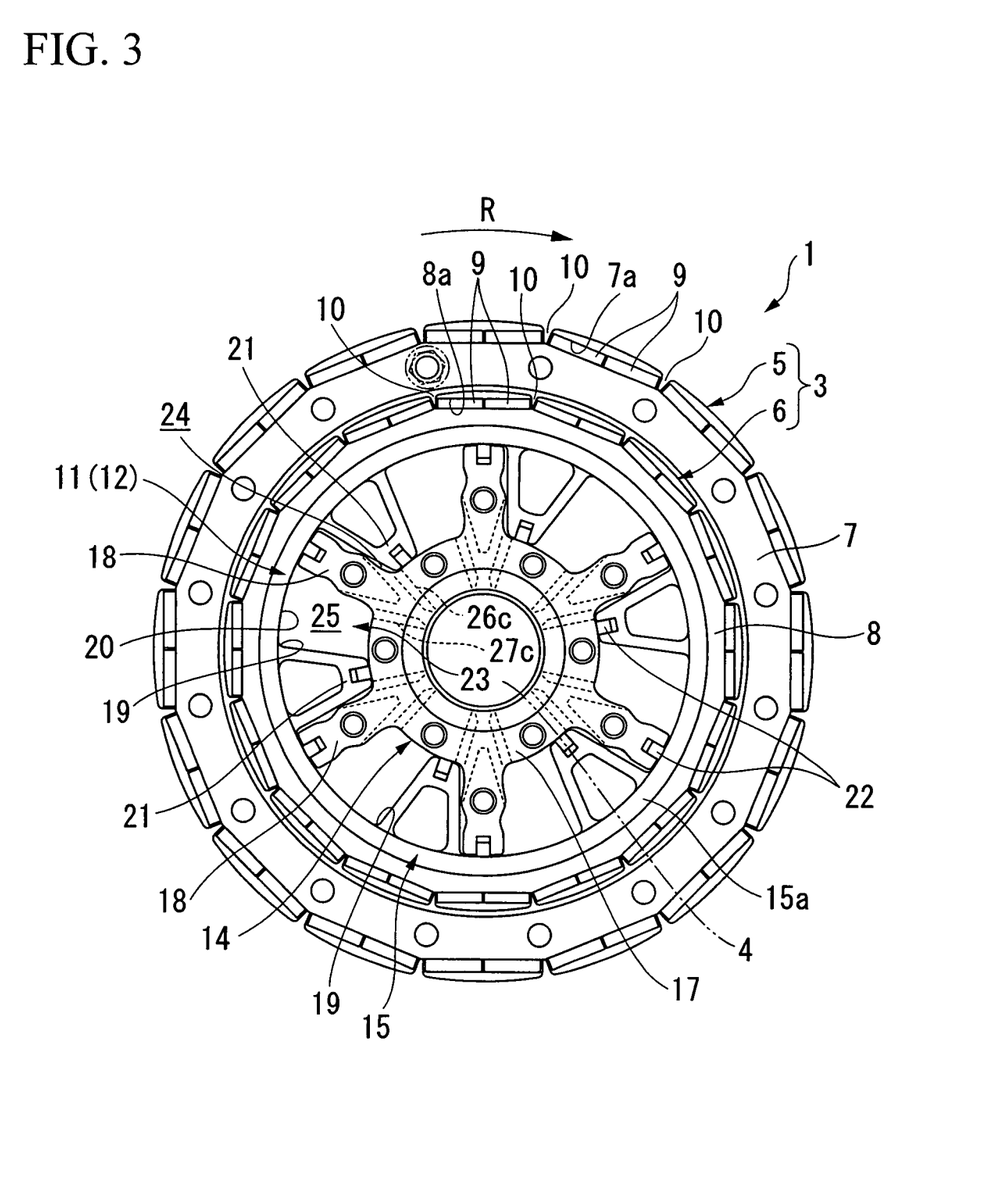
FIG. 3 is a side elevation view that excludes some components, showing the rotor unit that is controlled to the most trailing position of the motor according to the same embodiment.
Figure 4:
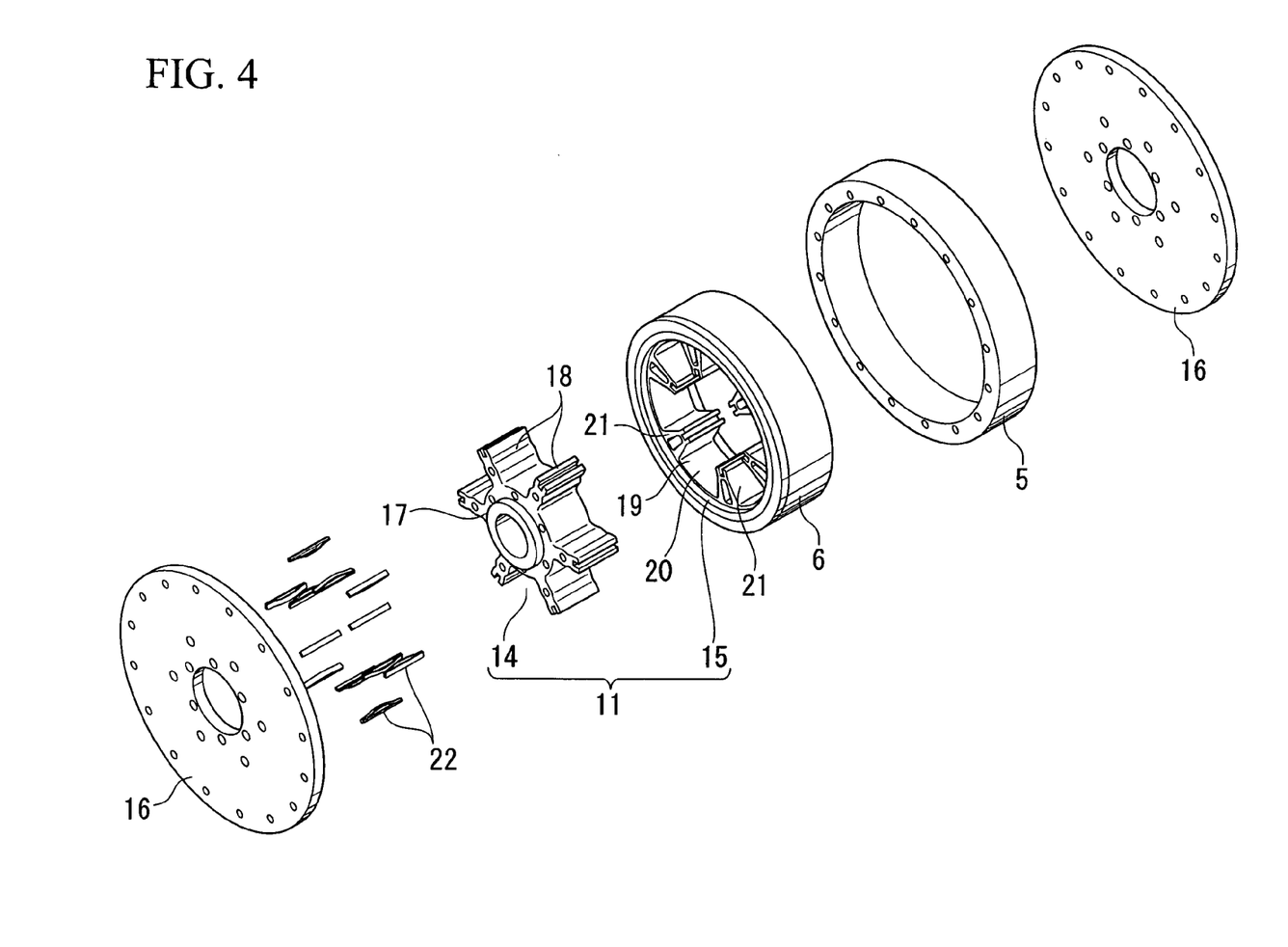
FIG. 4 is an exploded perspective view of the rotor unit of the motor according to the same embodiment.
Figure 5:
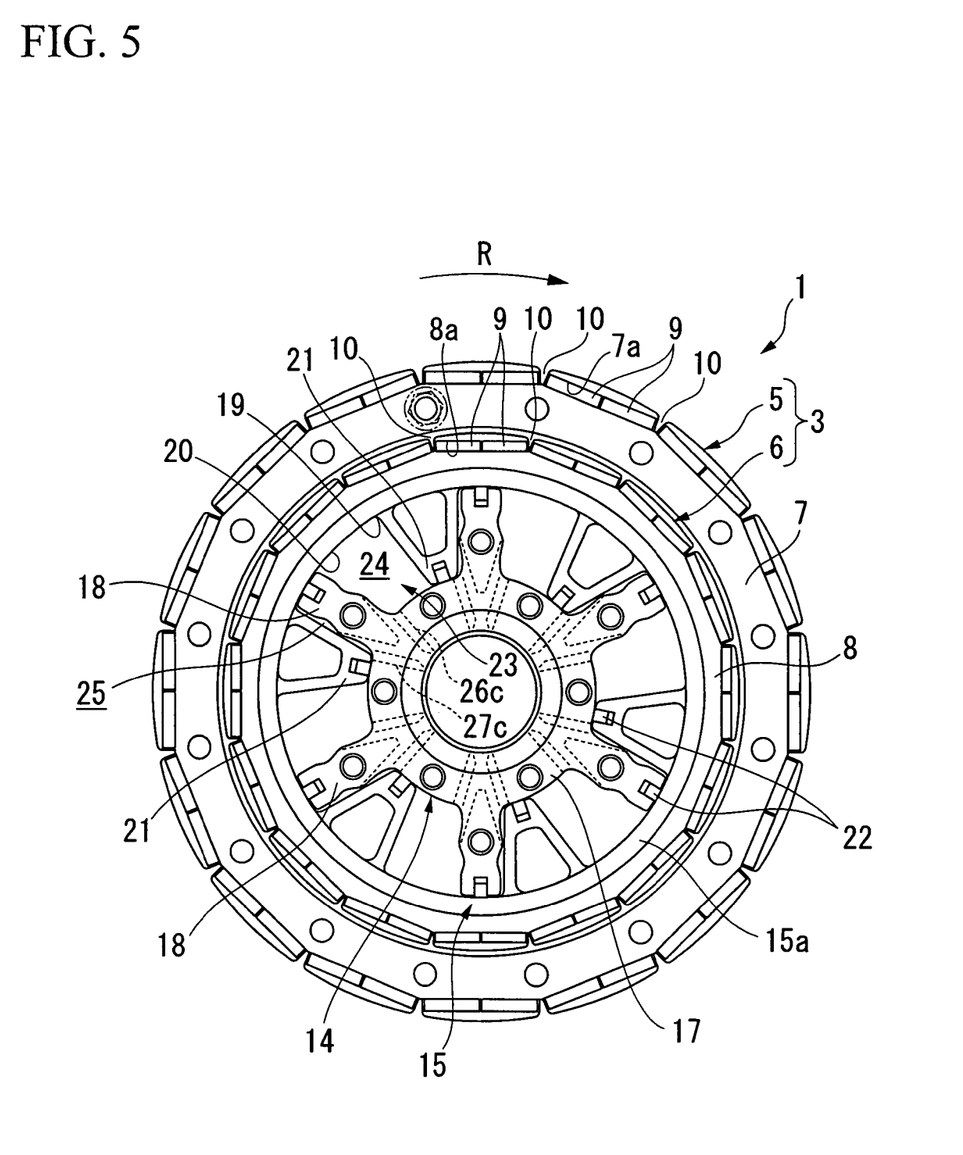
FIG. 5 is a side elevation view that excludes some components, showing the rotor unit that is controlled to the most leading position of the motor according to the same embodiment.
Figure 6A:
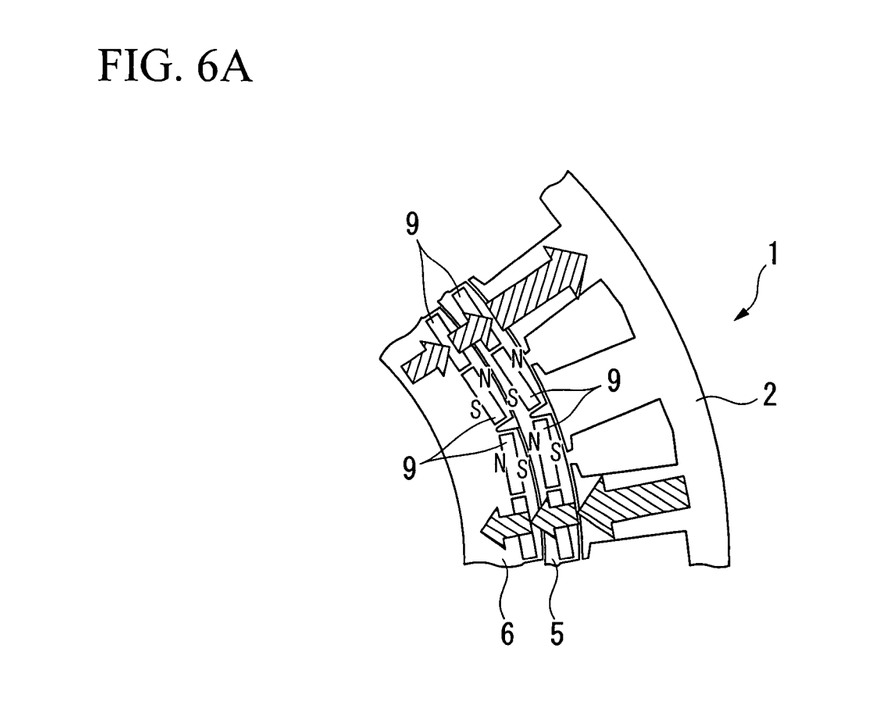
FIG. 6A is a drawing schematically showing a strong magnetic field state in which permanent magnets of an inner circumference side rotor and permanent magnets of an outer circumference side rotor of the motor according to the same embodiment are arranged with the same polarity.

In this case, "leading" refers to advancing the inner circumference side rotor 6 in the rotation direction of the motor 1 shown by the arrow R in FIG. 3 and FIG. 5 with respect to the outer circumference side rotor 5, and "trailing" refers to advancing the inner circumference side rotor 6 to the reverse side of the rotation direction R of the motor 1 with respect to the outer circumference side rotor 5.

Also, supply and discharge of the operating fluid for the leading side operating chamber 24 and the trailing side operating chamber 25 are performed through the rotation axis 4. Specifically, the leading side operating chamber 24 is connected to a leading side supply/discharge passage 26 of the hydraulic pressure control device 13 shown in FIG. 7, and the trailing side operating chamber 25 is connected to a trailing side supply/discharge passage 27 of the same hydraulic pressure control device 13. Moreover, a portion of the leading side supply/discharge passage 26 and the trailing side supply/discharge passage 27 is, as shown in for example in FIG. 2, constituted by passage holes 26a, 27a that are formed in the rotation axis 4 along the axial direction. Then, the end portion of each passage hole 26a, 27a is connected to an annular groove 26b and annular groove 27b that are formed at two positions in the outer circumferential surface of the rotation axis 4 offset in the axial direction, and these annular grooves 26b, 27b are connected to a plurality of conduction holes 26c, ..., 26c, 27c, ..., 27c that are formed in the boss portion 17 of the vane rotor 14 in the radial direction. Each conduction hole 26c of the leading side supply/discharge passage 26 connects the annular groove 26b and each leading side operating chamber 24, and each conduction hole 27c of the trailing side supply/discharge passage 27 connects the annular groove 27b and each trailing side operating chamber 25.

Figure 6B:
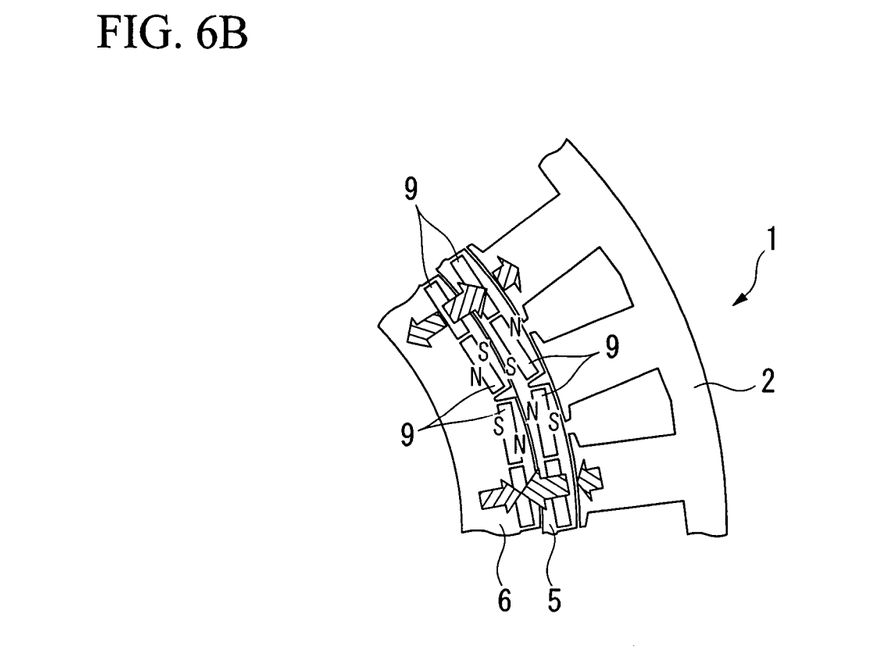
FIG. 6B is a drawing schematically showing a weak magnetic field state in which the permanent magnets of the inner circumference side rotor and the permanent magnets of the outer circumference side rotor of the motor according to the same embodiment are arranged with different polarity.

The motor 1 of the present embodiment is set so that, when the inner circumference side rotor 6 is in the most trailing position with respect to the outer circumference side rotor 5, the permanent magnets 9 of the outer circumference side rotor 5 and the inner circumference side rotor 6 each face different poles, leading to a strong magnetic field state (for example, refer to FIG. 3 and FIG. 6A), and when the inner circumference side rotor 6 is in the most leading position with respect to the outer circumference side rotor 5, the permanent magnets 9 of the outer circumference side rotor 5 and the inner circumference side rotor 6 each face the same pole, leading to a weak magnetic field state (for example, refer to FIG. 5 and FIG. 6B).

Note that the motor 1 can arbitrarily change the strong magnetic field state and weak magnetic field state by supply/discharge control of the operating fluid with respect to the leading side operating chamber 24 and the trailing side operating chamber 25, but when the strength of the magnetic field is thus changed, the induced voltage constant Ke thereby changes, and as a result the characteristics of the motor 1 are changed. That is, when the induced voltage constant Ke becomes large due to a strong magnetic field, the allowable rotational speed at which the motor 1 can be operated will fall, but the maximum torque that can be output increases. Conversely, when the induced voltage constant Ke becomes small due to a weak magnetic field, the maximum torque that can be output by the motor 1 decreases, but the allowable rotational speed at which the motor 1 can be operated will increase.

The hydraulic pressure control device 13, as shown for example in FIG. 7, is provided with an oil pump 32 that pumps up operating fluid from an oil tank (not illustrated) and emits it into passages; a regulator valve 35 that adjusts the hydraulic pressure of the operating fluid that is discharged from the oil pump 32 to introduce it to a line passage 33 and passes the excess portion of the operating fluid to a low-pressure passage 34 for lubricating and cooling various devices; and a channel selector 37 that distributes the operating fluid that is introduced to the line passage 33 to the leading side supply/discharge passage 26 and the trailing side supply/discharge passage 27 and discharges the operating fluid that is not required by the leading side supply/discharge passage 26 and the trailing side supply/discharge passage 27 to a drain passage 36.

The regulator valve 35 accepts the pressure of the line passage 33 as a control pressure and distributes the operating fluid by balance with a counterforce spring 38.

Also, the channel selector 37 has an electromagnetic solenoid 37b that advances and retracts a control spool 37a, and this electromagnetic solenoid 37b is controlled by the control apparatus 100a.

The control apparatus 100a, as shown in FIG. 1, is provided with a motor control portion 40, a PDU (power drive unit) 41, a battery 42, and an ENG control apparatus 43.

Figure 8:
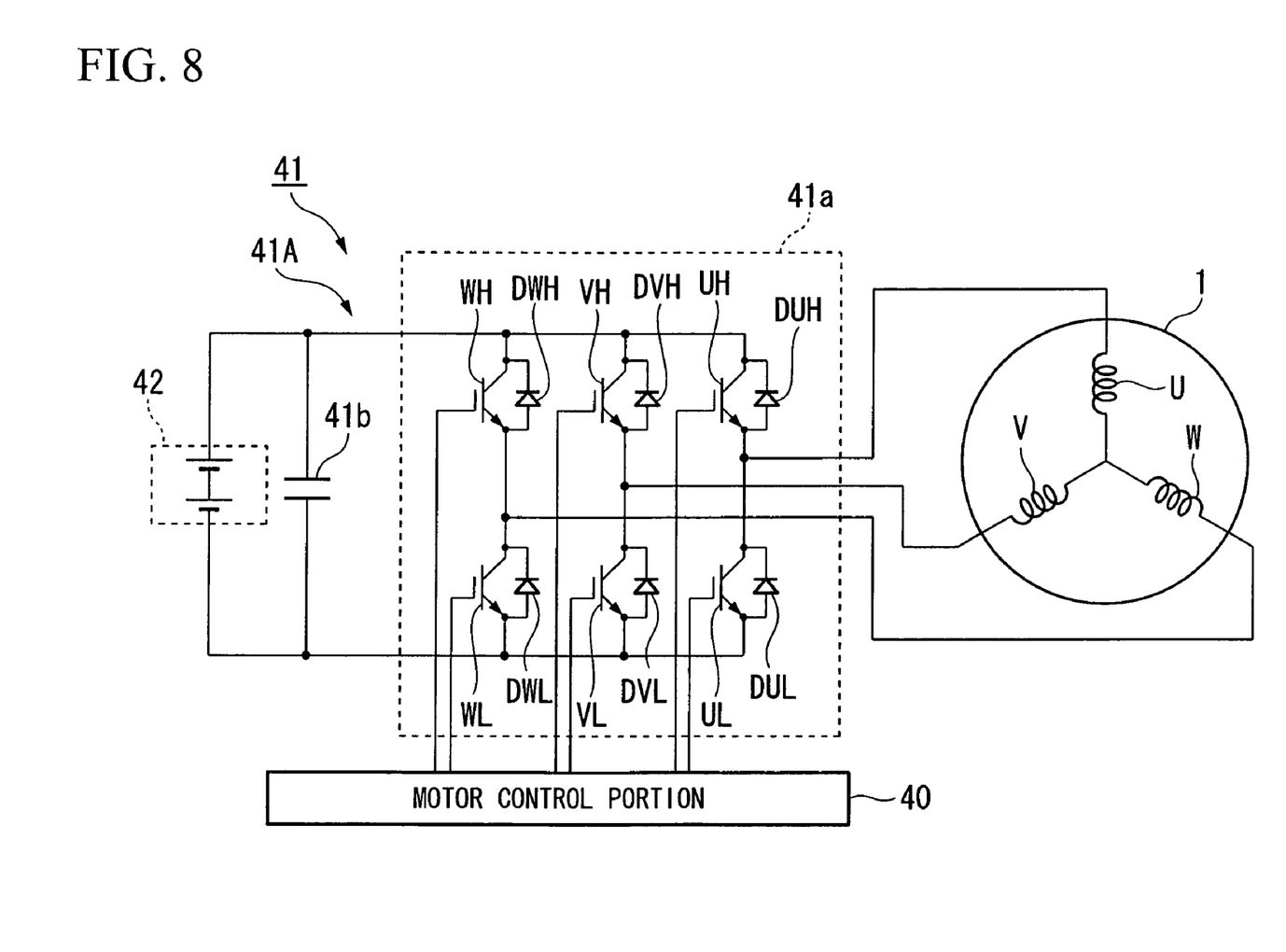
FIG. 8 is a lineblock drawing of the PDU according to the same embodiment.

The PDU 41, as shown for example in FIG. 8, is provided with a PWM inverter 41A that performs pulse width modulation using a bridge circuit 41a which uses a plurality of transistor switching devices in a bridge connection, and is connected to the high-voltage battery 42 that performs transfer of electrical energy with the motor 1.

The PWM inverter 41A that is provided in the PDU 41 is provided with the bridge circuit 41a in which high-side and low-side U-phase transistors UH, UL, high-side and low-side V-phase transistors VH, VL, and high-side and low-side W-phase transistors WH, WL forming pairs for each phase are bridge connected and a smoothing capacitor 41b. Each transistor UN, VH, WM constitutes a high side arm by being connected to the positive terminal of the battery 42. Each transistor UL, VL, WL constitutes a low side arm by being connected to the negative terminal of the battery 42. Each of the transistors UH, UL and VH, VL and WH, WL forming a pair for each phase is connected in series to the battery 42, and each diode DUH, DUL, DVH, DVL, DWH, DWL is connected between the collector-emitter of each transistor UH, UL, VH, VL, WH, WL so as to be in the forward direction from the emitter to the collector.

While driving for example the motor 1 and the like, the PWM inverter 41A switches between the ON (conducting) and OFF (cutoff) states of each of the transistors forming pairs for each phase, that is, transistors UH, UL, transistors VH, VL, and transistors WH, WL, in the PWM inverter 41A based on gate signals (that is, PWM signals) which are switching instructions input from the motor control portion 41, and thereby converts the DC power supplied from the battery 42 into three-phase AC power. And through successive commutation to supply current to the stator windings 2a of the motor 1, causes alternating U-phase current Iu, V-phase current Iv, and W-phase current Iw to flow in the stator windings 2a for each phase.

The motor control portion 40, as shown for example in FIG. 1, is one that performs feedback control of current in dq coordinates, which form a rotating orthogonal coordinate system. The motor control portion 40 computes the d-axis current command Idc and q-axis current command Iqc based on the torque command value Tq that is computed based on the detection result of the accelerator pedal opening sensor that detects the accelerator opening according to the accelerator operation by the driver, calculates the output voltages Vu, Vv, Vw for each phase based on the d-axis current command Idc and q-axis current command Iqc, and inputs PWM signals that are gate signals to the PDU 41 in accordance with the output voltages Vu, Vv, Vw for each phase. Further, the motor control portion 40 converts two phase currents among the phase currents Iu, Iv, Iw actually supplied from the PDU 41 to the motor 11 into currents in dq coordinates, and performs control such that the deviations of the d-axis current Id and the q-axis current Iq thus obtained from the d-axis current instruction Idc and q-axis current instruction Iqc are each zero.

This motor control portion 40 includes, for example, a target current setting unit 51; a current deviation calculating portion 52; a magnetic field controller 53; an electrical power controller 54; a current controller 55; a dq/three-phase converter 56; a PWM signal generator 57; a filter processor 58; a three-phase/dq converter 59; a rotational frequency calculator 60; an Ld-Lq calculator 61; an L calculator 62; an R calculator 63; a filter processor 64; a current measuring unit 65; a coil temperature Tc calculating unit 66; an induced voltage constant calculator 67; a magnet temperature Tm calculator 68; a demagnetization determination unit 69; and a short-circuit determination unit 70.

Input to this motor control portion 40 are detection signals Ius, Ivs, Iws output from the current sensors 81, 81 for each phase, which detect the two currents U-phase current Iu and W-phase current Iw among the three phase currents Iu, Iv, Iw output from the PDU 41 to the motor 1; detection signals output from the voltage sensor 82 which detects the terminal voltage (power supply voltage) VB of the battery 42; detection signals output from a rotation sensor 83 which detects the rotor rotation angle θM of the motor 1 (that is, the rotation angle of the magnetic poles of the rotor unit 3 from a predetermined reference rotation position); detection signals output from a phase sensor (not illustrated) that detects the relative phase (relative phase) θ between the outer circumference side rotor 5 and the inner circumference side rotor 6 that can be varied by the hydraulic pressure control device 13; and detection signals that are output from a plurality of wheel speed sensors (not illustrated) that detect the rotation speed (wheel speed) of each wheel of the vehicle 100.

The target current setting unit 51 computes current instructions specifying each of the phase currents Iu, Iv, Iw to be supplied to the motor 1 from the PDU 41, based on torque instructions Tr (for example, instruction values to cause the motor 1 to generate the torque required in response to the amount of operation of depression of the acceleration pedal AP by the driver) input from for example an external control device (not shown); the rotational frequency NM of the motor 1 input from the rotational frequency calculator 60. These current instructions are output to the current variation calculating portion 52 as the d-axis target current Idc and q-axis target current Iqc in rotating orthogonal coordinates.

The dq-coordinates which form a rotating orthogonal coordinate system take for example the d axis (magnetic field axis) in the magnetic pole magnetic flux direction of the rotor permanent magnet 9 of the outer circumference side rotor 5 of the rotor unit 3, and take the q axis (torque axis) in the direction orthogonal to this d axis, and rotate in synchronization with the rotation phase of the rotor unit 3 of the motor 1. With this, the d-axis target current Idc and q-axis target current Iqc, which are DC signals, are applied as current instructions for AC signals supplied to each of the phases of the motor 1 from the PDU 41.

The current variation calculating portion 52 is provided with a d-axis current deviation calculating portion 52a that calculates the deviation ΔId between the d-axis target current Idc to which is added a d-axis correction current that is input from the magnetic field controller 53 and the d-axis current Id, and a q-axis current deviation calculating portion 52b that calculates the deviation ΔIq between the q-axis target current Iqc to which is added a q-axis correction current that is input from the electrical power controller 54 and the q-axis current Iq.

Note that the magnetic field controller 53 outputs to the d-axis current deviation calculating portion 52a as the d-axis correction current the target value for the weak field current of the weak magnetic field control that controls the current phase by equivalently weakening the magnetic field amount of the rotor unit 3 for suppressing increases in the back induced voltage accompanying an increase for example in the rotation frequency NM of the motor 1.

Also, the electrical power controller 54 outputs the q-axis correction current for correcting the q-axis target current Iqc in accordance with a suitable electrical power control for the residual capacity of the battery 42 to the q-axis current deviation calculating portion 52b.

The current controller 55, by means of, for example, a PI (proportional integration) operation according to the motor rotational frequency NM, performs controlled amplification of the deviation ΔId to calculate the d-axis voltage instruction value Vd, and performs controlled amplification of the deviation ΔIq to calculate the q-axis voltage instruction value Vq.

The dq/three-phase converter 56 uses the rotation angle θM of the rotor unit 3 input from the rotational frequency calculator 60 to convert the d-axis voltage instruction value Vd and q-axis voltage instruction value Vq in dq-coordinates into a U-phase output voltage Vu, V-phase output voltage Vv, and W-phase output voltage Vw, which are voltage instruction values in three-phase AC coordinates, which is a static coordinate system.

The PWM signal generation portion 57 uses pulse-width modulation based on for example the sine-wave output voltages Vu, Vv, Vw for each phase, a sawtooth-wave carrier signal, and a switching frequency, to generate gate signals (that is, PWM signals) which are switching instructions including pulses to drive and turn ON/OFF each of the switching devices of the PWM inverter 41A in the PDU 41.

The filter processor 58 performs filter processing such as high frequency component removal and the like to extract as physical quantities each of the phase currents Iu, Iw from the detection signals Ius, Iws for each of the phase currents detected by the current sensors 81, 81.

The three-phase/dq converter 59 calculates the d-axis current Id and q-axis current Iq in rotating coordinates, that is, dq-coordinates, for the rotation phase of the motor 1 with the phase currents Iu, Iw which are extracted by the filter processor 58 and the rotation angle θM of the rotor unit 3 input from the rotational frequency calculator 60.

The rotational frequency calculator 60 extracts the rotation angle θM of the rotor unit 3 of the motor 1 from the detection signals output from the rotation sensor 83 and calculates the motor rotational frequency NM of the motor 1 based on this rotation angle θM.

The Ld-Lq calculator 61, during driving and regenerative operations of the motor 1, calculates the d-axis inductance Ld and the q-axis inductance Lq in accordance with the d-axis target current Idc and the q-axis target current Iqc output from the target current setting unit 51 by map searching for a predetermined map that shows the correlative relationship of the d-axis inductance Ld and the d-axis target current Idc and the predetermined map that shows the correlative relationship of the q-axis inductance Lq and the q-axis target current Iqc.

The L calculator 62 calculates the inductance component value L that corresponds to the d-axis inductance Ld and the q-axis inductance Lq based on the rotation angle θM that is output from the rotational frequency calculator 60.

The R calculator 63 calculates the phase resistance value R in accordance with the inductance component value L that is output from the L calculator 62 based on the phase current that is output from the current measuring unit 65 during execution of the motor three-phase short circuit control described below (that is, the short circuit current).

Note that the current measuring unit 65 calculates the phase current based on the U-phase current Iu that is output from the filter processor 64 that performs filter processing such as high frequency component removal on the detection signal Ius for the U-phase current that is detected by the current sensor 81.

The coil temperature Tc calculating unit 66 calculates the coil temperature Tc of the stator windings 2a based on the phase resistance value R that is output from the R calculator 63.

That is, the phase resistance value R, as shown for example in the following formula (1), is expressed by a predetermined phase resistance value $R_0$ at a predetermined reference temperature $T_0$ of the stator windings 2a and a coefficient of variation β (for example, β=0.00393) of the phase resistance by the coil temperature Tc. Thereby, the coil temperature Tc is calculated by the following formula (2) that is obtained by modifying the following formula (1).

$$R = R_0\{1 + \beta(Tc - T_0)\} \quad (1)$$

$$Tc = T_0 + \frac{1}{\beta} \cdot \left(\frac{R}{R_0} - 1\right) \quad (2)$$

The induced voltage coefficient calculating portion 67 calculates the induced voltage constant Ke based on the q-axis voltage instruction value Vq that is output from the current controller 55, the d-axis current Id and the q-axis current Iq that are output from the three-phase/dq converter 59, the d-axis inductance Ld that is output from the Ld-Lq calculator 61, and the phase resistance value R that is output from the R calculator 63.

That is, based on the voltage vector graph shown for example in FIG. 9, the circuit equation in dq coordinates is expressed as indicated for example by formula (3) below by the rotational angular velocity ω of the rotor. Thereby, the induced voltage constant Ke is calculated by the following formula (4) that is obtained by modifying the following formula (3).

$$\left.\begin{array}{l}Ke \cdot \omega + R \cdot Iq = Vq - \omega \cdot Ld \cdot Id \\ Vd = R \cdot Id - \omega \cdot Lq \cdot Iq\end{array}\right\} \quad (3)$$

$$\left.\begin{array}{l}R = \dfrac{Vd + \omega \cdot Lq \cdot Iq}{Id} \\ Ke = \dfrac{Vq - \omega \cdot Ld \cdot Id - R \cdot Iq}{\omega}\end{array}\right\} \quad (4)$$

A magnet temperature Tm calculator 68 calculates the magnet temperature Tm based on the induced voltage constant Ke that is output from the induced voltage coefficient calculating portion 67.

That is, the induced voltage constant Ke, as shown for example in formula (5) below, is expressed by a predetermined induced voltage constant Keo at a predetermined reference temperature $T_0$ of the permanent magnet 9 of the rotor unit 3, and the temperature coefficient β for the magnet temperature Tm of the permanent magnet 9 (for example, a=0.0011 for neodymium magnet). Thereby, the magnet temperature Tm is calculated by the below formula (6) that is obtained by modifying the below formula (5).

$$Ke = Ke_0\{1 + \alpha(Tm - T_0)\} \quad (5)$$

$$Tm = T_0 + \frac{1}{\alpha} \cdot \left(\frac{Ke}{Ke_0} - 1\right) \quad (6)$$

The demagnetization determination unit 69 determines whether or not the execution state of the motor three-phase short-circuit control is the demagnetization mode based on a demagnetization instruction that is output from for example an external control device and the phase current that is output from the current measuring unit 65 during execution of the motor three-phase short circuit control described below or the coil temperature Tc that is output from the coil temperature Tc calculating unit 66 or the induced voltage constant Ke that is output from the induced voltage coefficient calculating portion 67 or the magnet temperature Tm that is output from the magnet temperature Tm calculator 68 or the total time value (timer T) of a suitable timer. Moreover, this determination result is output to the clutch C, the hydraulic pressure control device 13, the ENG control apparatus 43, and the short-circuit determination unit 70.

For example, when the demagnetization determination unit 69 makes a determination of the demagnetization mode, the clutch C opens the connection between the motor 1 and the driving wheels W, the hydraulic pressure control device 13 increases the induced voltage constant Ke so as to set the motor 1 in the strong magnetic field state, and the ENG control apparatus 43 is set so as to execute high-rotation control of the engine.

The short-circuit determination unit 70, based on the rotational frequency NM of the motor 1 that is output from the rotational frequency calculator 60 and the determination result that is output from the demagnetization determination unit 69, outputs a short circuit instruction that designates the execution start or execution stop of the motor three-phase short circuit control to for example the current controller 55, the PWM signal generator 57, and the current measuring unit 65.

The short-circuit determination unit 70 outputs a short circuit instruction that designates the start of execution of the motor three-phase short circuit control in the case of the rotational frequency NM being greater than a predetermined rotational frequency Nref in the case of the demagnetization mode being determined in the demagnetization determination unit 69.

The short circuit instruction that designates the start of execution of the motor three-phase short circuit control is constituted by a short-circuit compensation instruction that designates the compensation for a voltage change according to the PI (proportional integration) operation during execution of the motor three-phase short circuit control to the current controller 55; the phase short-circuit instruction that designates the output of a switching instruction that sets the transistors UH, VH, WH and UL, VL, WL of the high side arm or low side arm of the PWM inverter 41A of the PDU 41 to the ON state to the PWM signal generator 57; and the instruction that designates the measurement and output of the phase current (that is, short circuit current) to the current measuring unit 65.

Figure 10:
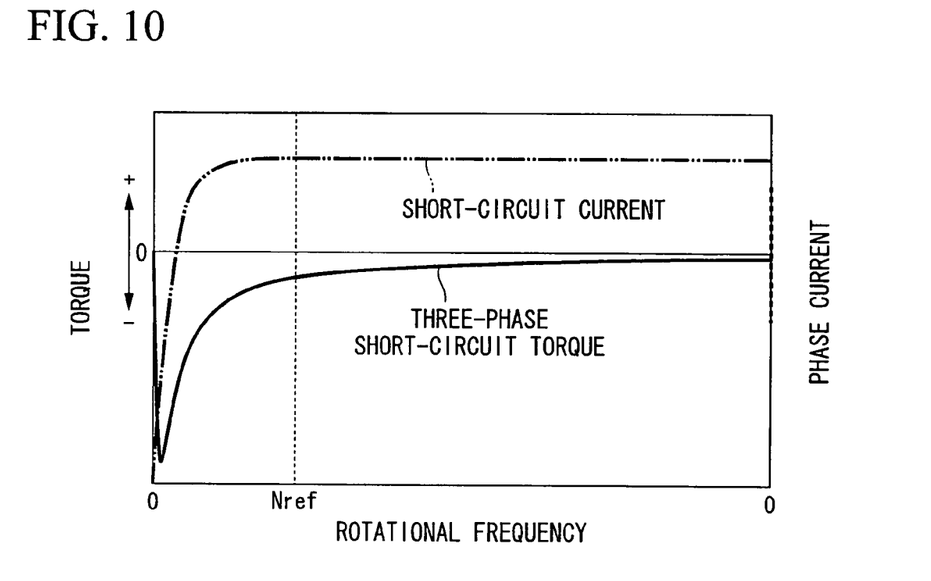
FIG. 10 is a graph that shows the relationship between the rotational frequency, and torque and phase current of the motor according to the same embodiment.

Also, the predetermined rotational frequency Nref with respect to the rotational frequency NM, as shown in FIG. 10, during execution of the motor three-phase short circuit control, is the rotational frequency at which changes in the phase currents that accompany changes in the rotational frequency NM (that is, the short circuit current) are constant currents that are less than a predetermined value and the three-phase short circuit torque reaches the region of low torque that is less than a predetermined value.

Figure 9:
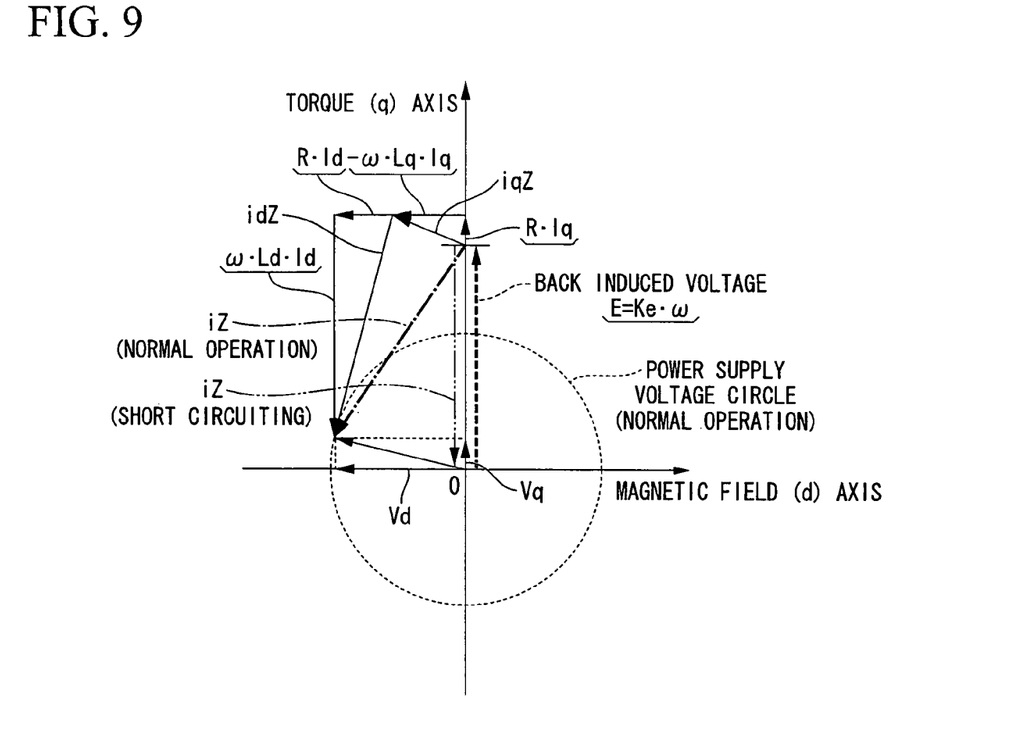
FIG. 9 is a voltage vector view according to the same embodiment.

Along with the start of execution of the motor three-phase short circuit control, as shown for example in FIG. 9, the power supply voltage circle of the predetermined voltage value during normal operation other than execution of the motor three-phase short circuit control is a power supply voltage circle of a voltage value of approximately zero that consists of the sum of the ON voltage that sets the transistors UH, VH, WH or UL, VL, WL to the ON state and the forward voltage of the floating diode during execution of the motor three-phase short circuit control.

Accompanying this, as in the example of the aforementioned prior art, during normal driving in the state of executing zero torque control that rotationally drives the motor 1 by the drive power of the internal combustion engine E and maintains the terminal voltage of the motor 1 equal to or less than the power supply voltage of the battery 42, the resultant vector of the voltage vectors corresponding to the impedance Z of the motor 1 and the d-axis current id and q-axis current iq becomes the voltage vector iZ (normal driving) by the phase current i of the motor 1. In contrast, during execution of the motor three-phase short circuit control, in the state of rotationally driving the motor 1 by the drive power of the internal combustion engine E, the armature magnetic flux of the weak magnetic field phase corresponding to the voltage vector iZ (short circuiting) that is equivalent to the back induced voltage Ke·ω is impressed on the permanent magnets 9 of the rotor unit 3, and the permanent magnets 9 are demagnetized by self heating due to overcurrent loss caused by this armature magnetic flux.

The motor control apparatus in the present embodiment (that is, the control apparatus 100a) has the above-described constitution. Next, the operation of this control apparatus 100a will be described.

Figure 11:
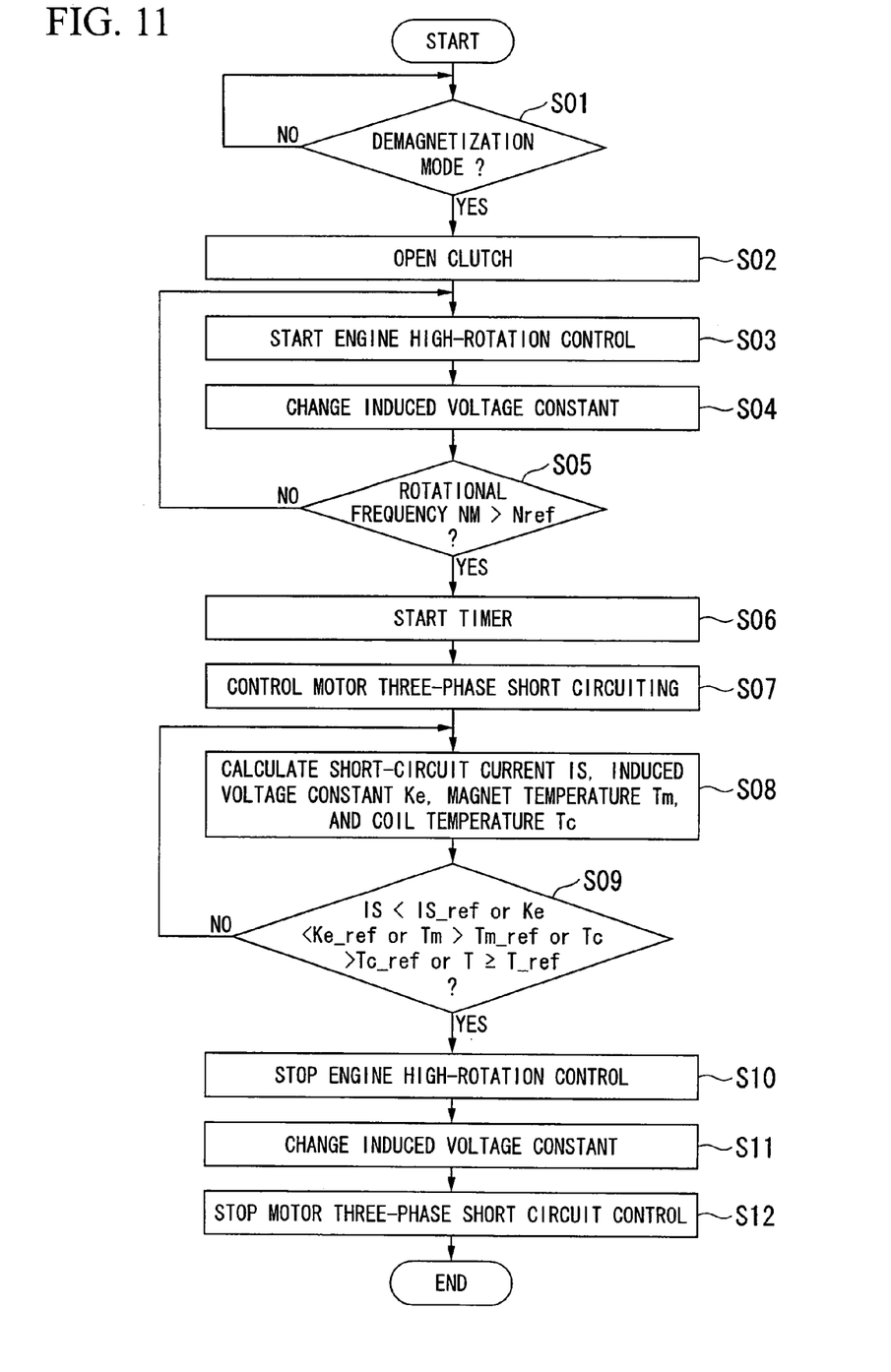
FIG. 11 is a flowchart that shows the operation of the motor control apparatus according to the same embodiment.

First, in step S01 shown in FIG. 11, it is determined whether or not the apparatus is in the demagnetization mode.

If the determination result is "NO", the processing of step S01 is repeated.

On the other hand, if the determination result is "YES", the processing proceeds to step S02.

Then, in step S02, the connection of the motor 1 and the driving wheels W by the clutch C is opened.

Then, in step S03, execution of engine high rotation control is started, and the motor 1 is rotationally driven by the drive power of the internal combustion E.

Then in step S04, the relative phase θ of the outer circumference side rotor 5 and the inner circumference side rotor 6 is controlled by the hydraulic pressure control device 13, and the induced voltage constant Ke is increased by setting the motor 1 to the strong magnetic field state.

Then, in step S05, it is determined whether or not the rotational frequency NM of the motor 1 that is output from the rotational frequency calculator 60 is greater than the predetermined rotational frequency Nref.

In the case of the determination result being "NO", the process returns to step S03.

On the other hand, in the case of the determination result being "YES", the process proceeds to step S06.

In step S06, the time of the timer starts.

In step S07, the execution of the motor three-phase short circuit control starts.

In step S08, the short circuit current IS, the induced voltage constant Ke, the magnet temperature Tm, and the coil temperature Tc are calculated.

In step S09, it is determined whether or not the short circuit current IS is smaller than the predetermined current value IS_ref, or whether the induced voltage constant Ke is smaller than the predetermined value Ke_ref, or whether the magnet temperature Tm is higher than the predetermined magnet temperature Tm_ref, or whether the coil temperature Tc is higher than the predetermined coil temperature Tc_ref, or whether the timer coil temperature Tc is higher than the predetermined coil temperature Tc_ref, or whether the time value of the timer (timer T) is equal to or greater than the predetermined value T_ref.

In the case of the determination result being "NO", the processing returns to step S08.

On the other hand, in the case of the determination result being "YES", the processing proceeds to step S10.

In step S10, the execution of the engine high-rotation control is stopped.

In step S11, the relative phase θ of the outer circumference side rotor 5 and the inner circumference side rotor 6 is controlled by the hydraulic pressure control device 13, and the state of the motor 1 (that is, the induced voltage constant Ke) is returned to the state prior to the start of execution of the engine high-rotation control in step S03 described above.

In step S12, the execution of motor three-phase short circuit control is stopped, and the series of processes is ended.

As described above, according to the motor control apparatus and motor control method by the present embodiment, it is possible to suitably demagnetize the permanent magnets 9 regardless of the state of the battery 42 by the motor three-phase short circuit control.

Moreover, when the operating condition of the motor 1 moves from ordinary operation other than execution of motor three-phase short circuit control to the state of execution of motor three-phase short circuit control, it is possible to prevent the occupants of the vehicle 100 from feeling a sense of discomfort in the behavior of the vehicle 100 due to excessively large torque fluctuations occurring, possible to accurately calculate each motor constant in the state of variations of each motor constant (for example, the d-axis inductance Ld and q-axis inductance Lq, etc.) being relatively small, and possible to stably impress the armature magnetic flux of the desired weak magnetic field phase onto the permanent magnets 9 of the rotor unit 3. It is therefore possible to cause the permanent magnets 9 to undergo self heating due to overcurrent loss caused by this armature magnetic flux and suitably and efficiently demagnetize the permanent magnets 9.

Moreover, during execution of motor three-phase short circuit control, in the case of the magnet temperature Tm being higher than the predetermined magnet temperature Tm_ref, or the coil temperature Tc being higher than the coil temperature, by stopping the execution of the engine high-rotation control and motor three-phase short circuit control, it is possible to prevent heat damage from occurring in the motor 1.

Also, during execution of motor three-phase short circuit control, when the time value of the timer (timer T) is equal to or greater than a predetermined value, by stopping the engine high-rotation control and motor three-phase short circuit control, it is possible to prevent excessive energy consumption.

Also, during execution of the motor three-phase short circuit control, by increasing the induced voltage constant Ke of the motor 1 by the rotating mechanism 11, it is possible to increase the armature magnetic flux of the weak magnetic field phase that is impressed on the permanent magnets 9 of the rotor unit 3, and possible to efficiently demagnetize the permanent magnets 9.

Note that the present invention is not limited to the aforementioned embodiments, and for example may be applied to an electric automobile other than a hybrid vehicle, and without being limited to the case of application to a vehicle, may be applied to a suitable apparatus that is equipped with another driving source other than an internal combustion engine of the aforementioned vehicle.

Note that in the above-described embodiment, the motor 1 is provided with a multiple rotor having the outer circumference side rotor 5 and the inner circumference side rotor 6, with the induced voltage constant Ke being variable, but is not limited thereto. The motor 1 may be a motor equipped with a simple rotor and the induced voltage constant Ke being fixed to a predetermined value.

While a preferred embodiment of the invention has been described and illustrated above, it should be understood that this is exemplary of the invention and not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor control method comprising the steps of:
    rotationally driving with a driving source a motor that is provided with a rotor having permanent magnet pieces, and a stator; and
    short circuiting a plurality of phases of the motor when the rotational frequency of the motor is equal to or greater than a predetermined rotational frequency, wherein
    when at least a motor state quantity including the phase currents of the motor fluctuates by at least a predetermined value during execution of the short circuiting, the short circuiting and the rotational driving are stopped.

2. A motor control apparatus comprising:
    a motor provided with a rotor having permanent magnet pieces, and a stator;
    a driving source that rotationally drives the rotor;
    a short circuiting device that short circuits a plurality of phases of the motor;
    a control device that rotationally drives the rotor with the driving source, and short circuits the plurality of phases of the motor by the short circuiting device in the case of the rotational frequency of the motor being equal to or greater than a predetermined rotational frequency; and
    a detection device that detects at least a motor state quantity including the phase currents of the motors, wherein
    the control device stops the short circuiting operation by the short circuiting device and the rotational driving operation by the driving source in the case of a detection value obtained by the detection device or a state quantity according to this detection value fluctuating by at least a predetermined value in the state of short circuiting a plurality of phases of the motor.

3. The motor control apparatus according to claim 2, wherein:
    the driving source is an internal combustion engine;
    the motor and the internal combustion engine are mounted in a vehicle as the driving source that drives the vehicle for traveling; and
    a connecting/disconnecting device is provided capable of connecting/disconnecting a coupling between driving wheels of the vehicle, and the motor and the internal combustion engine, wherein
    the control device releases a coupling between the driving wheels of the vehicle, and the motor and the internal combustion engine with the connecting/disconnecting device when rotationally driving the rotor with the internal combustion engine.

4. A motor control apparatus comprising
    a motor provided with a rotor having permanent magnet pieces, and a stator;
    a driving source that rotationally drives the rotor,
    a short circuiting device that short circuits a plurality of phases of the motor;
    a control device that rotationally drives the rotor with the driving source, and short circuits the plurality of phases of the motor by the short circuiting device in the case of the rotational frequency of the motor being equal to or greater than a predetermined rotational frequency, wherein
    the rotor is provided with a plurality of rotor members each equipped with the permanent magnet pieces and capable of changing the mutual relative phases, and a phase changing device that changes the induced voltage constant by changing the relative phases of the rotor members; and
    the control device increases the induced voltage constant by at least a predetermined value by the phase changing device when short circuiting the plurality of phases of the motor.

5. The motor control apparatus according to claim 4, wherein:
    the driving source is an internal combustion engine;
    the motor and the internal combustion engine are mounted in a vehicle as the driving source that drives the vehicle for traveling; and
    a connecting/disconnecting device is provided capable of connecting/disconnecting a coupling between driving wheels of the vehicle, and the motor and the internal combustion engine, wherein
    the control device releases a coupling between the driving wheels of the vehicle, and the motor and the internal combustion engine with the connecting/disconnecting device when rotationally driving the rotor with the internal combustion engine.

* * * * *